US008112269B2

(12) United States Patent
Cao et al.

(10) Patent No.: US 8,112,269 B2
(45) Date of Patent: Feb. 7, 2012

(54) DETERMINING UTILITY OF A QUESTION

(75) Inventors: Yunbo Cao, Beijing (CN); Chin-Yew Lin, Beijing (CN)

(73) Assignee: Microsoft Corporation, Redmond, WA (US)

( * ) Notice: Subject to any disclaimer, the term of this patent is extended or adjusted under 35 U.S.C. 154(b) by 835 days.

(21) Appl. No.: 12/197,991

(22) Filed: Aug. 25, 2008

(65) Prior Publication Data

US 2010/0049498 A1    Feb. 25, 2010

(51) Int. Cl.
*G06F 17/27* (2006.01)
*G06F 17/21* (2006.01)
*G06F 17/30* (2006.01)

(52) U.S. Cl. ............... 704/9; 704/10; 707/736; 707/759
(58) Field of Classification Search ........................ None
See application file for complete search history.

(56) References Cited

U.S. PATENT DOCUMENTS

| | | | |
|---|---|---|---|
| 6,665,666 | B1 | 12/2003 | Brown et al. |
| 6,766,320 | B1 | 7/2004 | Wang et al. |
| 6,871,174 | B1* | 3/2005 | Dolan et al. ............ 704/9 |
| 7,076,456 | B1 | 7/2006 | Rofrano |
| 7,809,548 | B2* | 10/2010 | Mihalcea et al. ........ 704/1 |
| 7,912,702 | B2* | 3/2011 | Bennett ................. 704/9 |
| 2002/0111934 | A1 | 8/2002 | Narayan |
| 2002/0169595 | A1* | 11/2002 | Agichtein et al. ....... 704/9 |
| 2005/0266387 | A1 | 12/2005 | Rossides |
| 2007/0022099 | A1* | 1/2007 | Yoshimura et al. ...... 707/3 |
| 2007/0192168 | A1 | 8/2007 | Van Luchene |
| 2007/0233730 | A1 | 10/2007 | Johnston |
| 2008/0040339 | A1 | 2/2008 | Zhou et al. |
| 2008/0195378 | A1* | 8/2008 | Nakazawa et al. ....... 704/9 |

FOREIGN PATENT DOCUMENTS

WO    WO-2008/012834    1/2008

OTHER PUBLICATIONS

Gomez et al., "A Passage Retrieval System for Multilingual Question Answering", Indian International Conference on Artificial Intelligence—IICAI , pp. 686-702, 2005.*

Suzuki et al., "Question Type Classification using Word Attribute N-gram and Statistical Machine Learning", Transactions of the Information Processing Society of Japan, vol. 44, No. 11, pp. 2839-2853, Nov. 2003.*

(Continued)

*Primary Examiner* — Brian Albertalli
(74) *Attorney, Agent, or Firm* — Perkins Coie LLP

(57) ABSTRACT

A question search system provides a collection of questions having words for use in evaluating the utility of the questions based on a language model. The question search system calculates n-gram probabilities for words within the questions of the collection. The n-gram probability of a word for a sequence of n−1 words indicates the probability of that word being next after that sequence in the collection of questions. The n-gram probabilities for the words of the collection represent the language model of the collection. The question search system calculates a language model utility score for each question within a collection that indicates the likelihood that a question is repeatedly asked by users. The question search system derives the language model utility score for a question from the n-gram probabilities of the words within that question.

21 Claims, 11 Drawing Sheets

OTHER PUBLICATIONS

Hedstrom, Anna, "Question Categorization for a Question Answering System Using a Vector Space Model," Master's Thesis in Computational Linguistics, Uppsala University, 2005.
Burke, R.D., et al., "Question Answering from Frequently-Asked Question Files: Experiences with the FAQ Finder System," Technical Report, UMI Order No. TR-97-05, University of Chicago, Jun. 1997.
Kwok, Cody et al., "Scaling Question Answering to the Web," ACM Transactions on Information Systems, vol. 19, No. 3, Jul. 2001, pp. 242-262.
Erkan, G. et al., "Lexrank: Graph-Based Centrality as Salience in Text Summarization," Journal of Artificial Intelligence Research 22, 2004.
Erkan, Gunes et al., "Biased LexRank: Passage Retrieval Using Random Walks with Question-Based Priors," Information Process Management, vol. 45, No. 1, 2009, pp. 42-54.
Jeon. J., et al, "Finding Similar Questions in Large Question and Answer Archives". Proceedings of the 14th ACM International Conference on Information and Knowledge Management, CIKM 2005, pp. 84-90.
Jeon, J., et al., "A Framework to Predict the Quality of Answers With Non-Textual Features," SIGIR 2006, Seattle, Washington, Aug. 6-11, 2006. pp. 228-235.
Jones, K. S., et al., "A Probabilistic Model of Information Retrieval: Development and Comparative Experiments." Information Processing and Management, vol. 36, No. 6, 2000, pp. 809-840.
Katz, Slava M. "Estimation of Probabilities From Sparse Data for The Language Model Component of a Speech Recognizer," IEEE Transactions on Acoustics, Speech, and Signal Processing, vol. ASSP-35, No. 3. Mar. 1987 (2 pages).
Kleinberg, J.M., "Authoritative Sources in a Hyperlinked Environment," 1998, pp. 668-677.
Kurland, O., and Lee, L., "PageRank Without Hyperlinks: Structural Re-ranking Using Links Induced by Language Models," SIGIR 2005, ACM, pp. 306-313.
Manning, Christopher D. et al., "Foundations of Statistical Natural Language Processing," MIT Press 2000.
Otterbacker, Jahna, et al., "Using Random Walks for Question-Focused Sentence Retrieval." Proceedings of the Conference on Human Language Technology and Empirical Methods in Natural Language Processing, 2005, pp. 915-922.
Richardson, M., et al., "Beyond PageRank: Machine Learning for Static Ranking," Proceedings of the 15th International Conference on World Wide Web 2006, pp. 707-715.
Riezler, S., et al., "Statistical Machine Translation for Query Expansion in Answer Retrieval," ACL 2007, 8 pages.
Sergey Brin, Lawrence Page, "The Anatomy of a Large-Scale Hypertextual Web Search Engine," Computer Networks and ISDN Systems, 1998, vol. 30, Issue 1-7, pp. 107-117.
Sneiders, Eric, "Automated Question Answering Using Question Templates that Cover the Conceptual Model of the Database," Proceedings of the 6th International Conference on Applications of Natural Language to Information Systems, 2002, pp. 235-239.
Young-In Song, et al., "Question Utility: A Novel Static Ranking of Question Search," Proceedings of AAAI, 2008, pp. 1231-1236.
Zhai, C. and Lafferty, J., "A Study of Smoothing Methods for Language Models Applied to Ad Hoc Information Retrieval". Proceedings of the 24th Annual International ACM SIGIR Conference on Research and Development in Information Retrieval, 2001, pp. 334-342.
Zhou, Y. and Croft, W.B., "Document Quality Models for Web Ad Hoc Retrieval," Proceedings of the 14th ACM International Conference on Information and Knowledge Management, 2005, pp. 331-332.

* cited by examiner

DETERMINING UTILITY OF A QUESTION

BACKGROUND

Many search engine services, such as Google and Live Search, provide for searching for information that is accessible via the Internet. These search engine services allow users to search for display pages, such as web pages, that may be of interest to users. After a user submits a search request (i.e., a query) that includes search terms, the search engine service identifies web pages that may be related to those search terms. To quickly identify related web pages, the search engine services may maintain a mapping of keywords to web pages. This mapping may be generated by "crawling" the web (i.e., the World Wide Web) to identify the keywords of each web page. To crawl the web, a search engine service may use a list of root web pages to identify all web pages that are accessible through those root web pages. The keywords of any particular web page can be identified using various well-known information retrieval techniques, such as identifying the words of a headline, the words supplied in the metadata of the web page, the words that are highlighted, and so on. The search engine service may generate a relevance score to indicate how relevant the information of the web page may be to the search request based on the closeness of each match, web page importance or popularity (e.g., Google's PageRank), and so on. The search engine service then displays to the user links to those web pages in an order that is based on a ranking that may be determined by their relevance, popularity, or some other measure.

Some online services, such as Yahoo! Answers and Live QnA, have created large collections of questions and their corresponding answers. These Q&A services may provide traditional frequently asked question ("FAQ") services or may provide community-based services in which members of the community contribute both questions and answers to those questions. These Q&A services provide a mechanism that allows users to search for previously generated answers to previously posed questions. These Q&A services typically input a queried question from a user, identify questions of the collection that relate to the queried question (i.e., a question search), and return the answers to the identified questions as the answer to the queried question.

Such Q&A services typically treat the questions as plain text. The Q&A services may use various techniques including a vector space model when performing a question search. Table 1 illustrates example results of a question search for a queried question.

TABLE 1

Queried Question:
Q1: Any cool clubs in Berlin or Hamburg?
Expected Question
Q2: What are the best/most fun clubs in Berlin?
Not Expected Question:
Q3: Any nice hotels in Berlin or Hamburg?
Q4: How long does it take to get to Hamburg from Berlin?
Q5: Cheap hotels in Berlin?

Such Q&A services may identify questions Q2, Q3, Q4, and Q5 as being related to queried question Q1. The Q&A services typically cannot determine, however, which identified question is most related to the queried question. In this example, question Q2 is most closely related to queried question Q1. The Q&A services nevertheless provide a ranking of the relatedness of the identified questions to the queried questions. Such a ranking may represent the queried question and each identified question as a feature vector of keywords. The relatedness of an identified question to the queried question is based on the closeness of their feature vectors. The closeness of the feature vectors may be determined using, for example, a cosine similarity metric.

Moreover, the Q&A services typically cannot determine which of various questions that appear to be equally relevant would be most useful to a user. For example, if the queried question is "Best of Berlin?," then the questions of Table 2 might be returned.

TABLE 2

Queried Question:
Q6: Best of Berlin?
Result Questions:
Q7: What is the best hospital to work at in Berlin?
Q8: Where is the best restaurant in Berlin?

Because questions Q7 and Q8 both ask "something best in Berlin," Q&A services consider both of them relevant to queried question Q6 and rank them equally high. However, question Q7 would likely be helpful to only a small number of people, whereas question Q8 would likely be helpful to many more people.

SUMMARY

A method and system for evaluating the utility of a question is provided. The utility of a question represents a likelihood that the question is repeatedly asked by users. A question search system provides a collection of questions having words for use in evaluating the utility of the questions based on a language model. The question search system calculates n-gram probabilities for words within the questions of the collection. The n-gram probability of a word for a given sequence of n−1 words indicates the probability of that word being next after that sequence in the collection of questions. The n-gram probabilities for the words of the collection represent the language model of the collection. The question search system calculates a language model utility score for each question within a collection. The question search system derives the language model utility score for a question from the n-gram probabilities of the words within that question. The language model utility score is a measure of the utility of a question relative to other questions in the collection.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
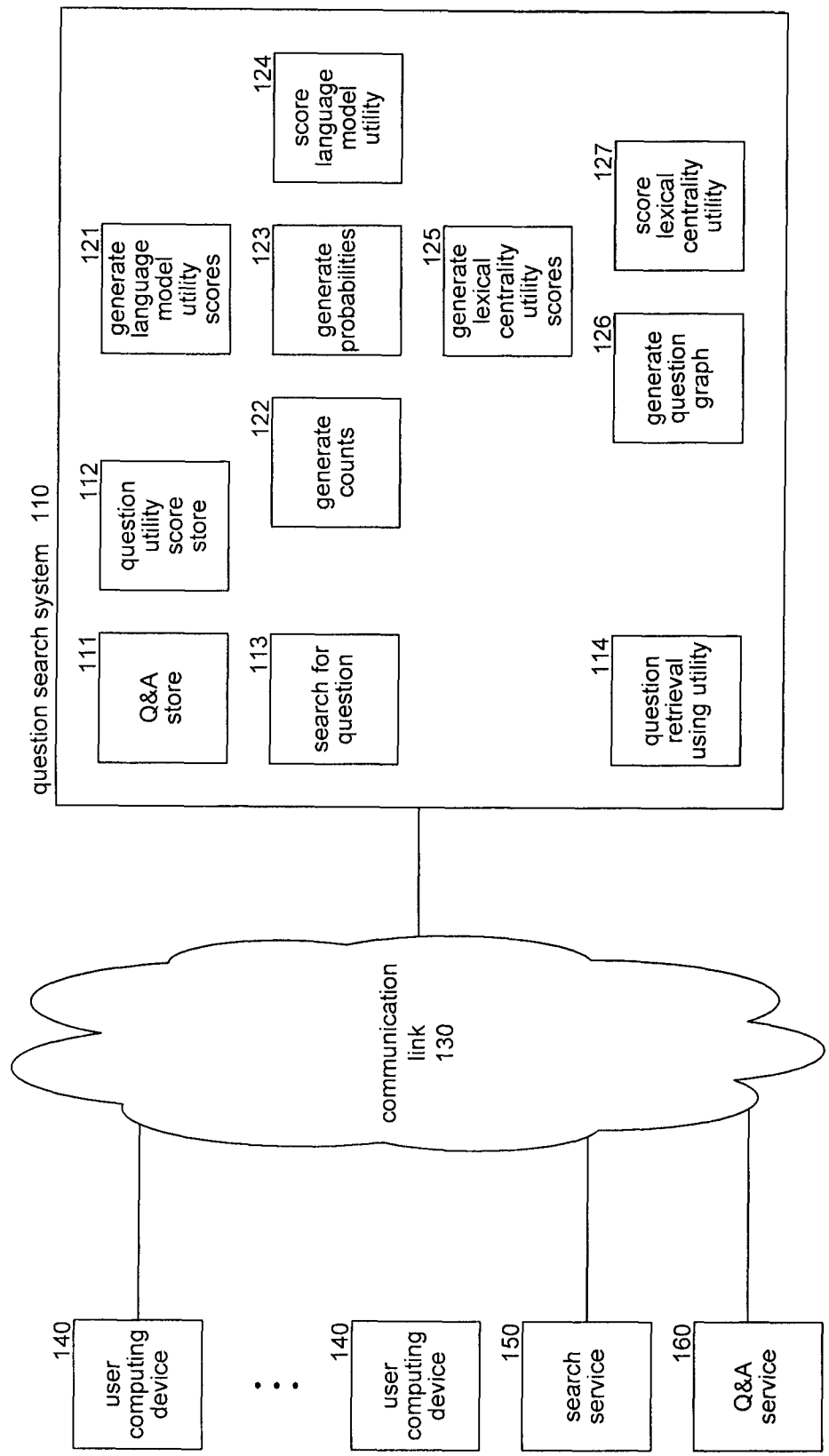
FIG. 1 is a block diagram that illustrates components of a question search system in some embodiments.

A method and system for evaluating the utility of a question is provided. The utility of a question represents a likelihood that the question is repeatedly asked by users. The utility of a question may be represented by a language model, a lexical centrality model, or other model. In some embodiments, a question search system provides a collection of questions having words for use in evaluating the utility of the questions based on a language model. The question search system calculates n-gram probabilities of the words within the questions of the collections. The n-gram probabilities of a word indicate the probabilities of that word following each n−1 sequence of words in the collection of questions. For example, if n is equal to 3, then the trigram probabilities for a word is the probability that that word follows each sequence of 2 words in the collection. The n-gram probabilities for the words of the collection represent the language model of the collection. The question search system calculates a language model utility score for each question within a collection. The language model utility score for a question indicates the likelihood that a question is repeatedly asked by users. The question search system derives the language model utility score for a question from the n-gram probabilities of the words within that question. For example, if the question is "What is the best hospital to work at in Berlin?" the trigrams may include "what best hospital" and "best hospital work." The probabilities that "work" will follow "what best hospital" and that "Berlin" will follow "best hospital work" may be $2\times10^{-5}$ and $1\times10^{-5}$, respectively, which may result in a language model utility score of $2\times10^{-10}$. The language model utility score is a measure of the utility of a question relative to other questions in the collection.

In some embodiments, the question search system may use the utility score, including the language model utility score, of questions to rank questions of a collection that are identified as being relevant to a queried question. The question search system may identify questions of the collection that are relevant to a queried question using conventional similarity techniques such as cosine similarity based on feature vectors of keywords of questions of the collection and of the queried question. The question search system may represent the relevance of a question to a queried question as a relevance score. The question search system then ranks the identified questions based, at least in part, on a utility score generated for the questions. To generate a ranking, the question search system may generate a combined score based on the utility scores and the relevance scores of the identified questions. The question search system then provides the identified questions and their rankings as the search result of the queried question. In this way, the question search system factors in the utility of a question when ranking search results.

In some embodiments, the question search system generates a lexical centrality utility score as an indication of the utility of a question. The lexical centrality utility score may represent the utility of a question by itself or may be combined with a language model utility score to represent the utility of a question. The lexical centrality utility scores for the questions may be generated by generating a question graph with nodes representing the questions. The question search system adds links between nodes of the question graph when the similarity between the nodes satisfies a similarity threshold. Thus, the link between two nodes indicates that the connected nodes (also referred to as adjacent nodes) are similar. The question search system establishes an initial lexical centrality utility score for the question of each node. The question search system then determines a stationary probability distribution for the lexical centrality utility scores for the nodes. Thus, the resulting lexical centrality utility score for a node is based in the lexical centrality utility score of connected nodes, which may be solved iteratively.

In some embodiments, the question search system evaluates the utility of a question Q by determining the probability p(Q) that question Q occurs in the collection. The question search system may determine the probability p(Q) by counting all the occurrences of the question within certain question collection C and then normalizing the count into a probability by dividing by the total number of questions in collection C. Such an approach for determining probability of questions, however, may not accurately account for questions that are semantically similar but have different textual representations. Although semantically similar questions might be represented by a single textual representation, current techniques for generating such a single textual representation may be less than effective.

In some embodiments, the question search system uses a language modeling approach to estimate the probabilities of the sentences being generated by a language model of the collection. The question search system may use an n-gram language model to estimate the probability p(Q) of question Q as represented by the following:

$$p(Q) = p(q_1, q_2, \ldots q_m) \approx \sum_{i=1}^{m} p(q_i \mid q_{i-n+1}^{i-1}) \quad (1)$$

where p(Q) represents the probability of question Q, $q_i$ represents the ith word in question Q, m represents the number of words in question Q, $q_{i-n+1}^{i-1}$ represents an sequence of n−1 words from word $q_{i-n+1}$ to word $q^{i-1}$, and $p(q_i \mid q_{i-n+1}^{i-1})$ represents the conditional probability of word $q_i$ given the sequence of n−1 words $q_{i-n+1}^{i-1}$. Equation 1 represents a unigram model when n is set to 1 and a trigram model when n is set to 3. In some embodiments, the question search system may account for sparseness of n-grams in the collection using a back-off method proposed by Katz. (See Katz, S., "Estimation of Probabilities from Sparse Data for the Language Model Component of a Speech Recognizer," *IEEE Transactions on Acoustics Speech and Signal Processing* 35(3):400-401, 1987, which is hereby incorporated by reference.)

In some embodiments, the question search system may normalize the probabilities to account for the length of a question. Since the probabilities of short questions are generally higher than the probability of long questions, the question search system uses a log-based normalization as represented by the following:

$$p_{norm}(Q) \propto \exp\left[\frac{\log p(Q)}{\log(m+\alpha)}\right] \quad (2)$$

where $p_{norm}(Q)$ represents the normalized probability of question Q and α (e.g., 0.1) represents a smoothing parameter in the event that m equals 1.

In some embodiments, the question search system may use other techniques for scoring the utility of a question. One such technique identifies the most central questions in a collection based on lexical centrality. Lexical centrality is based on the assumption that if a topic is very useful to people, there will be many based on the assumption that if a topic is very useful to people, there will be many lexically similar questions related to the topic in the collection. Lexical centrality regards the most central questions as the most representative (or useful) questions from a group of lexically similar questions.

In some embodiments, the question search system measures lexical centrality of questions by adapting a technique proposed for document summarization referred to as LexRank. (See Erkan, G., and Radev, D. R., "LexRank: Graph-Based Centrality as Salience in Text Summarization," *Journal of Artificial Intelligence Research* 22, 2004, which is hereby incorporated by reference.) LexRank estimates the centrality of a sentence using a page ranking algorithm. In some embodiments, to generate lexical centrality utility scores for questions of the collection, the question search system generates a question graph with a node for each question of the collection with links between nodes whose similarities are above a threshold. The question search system calculates the similarity between each pair of questions using, for example, a cosine similarity metric. If the similarity between a pair of questions satisfies a similarity threshold, the question search system adds a link between the corresponding nodes in the question graph. The question search system then calculates the centrality C(Q) for each question Q based on the random walk algorithm with a weighting scheme represented by the following:

$$c_i(Q) = \frac{d}{N} + (1-d) \sum_{v \in adj[Q]} \frac{c_{i-1}(v)}{deg(v)} \quad (3)$$

where $c_i(Q)$ represents the lexical centrality utility score for question Q at the ith iteration, N represents the total number of nodes in the question graph, d represents a dampening factor, adj[Q] represents the set of nodes adjacent to the node representing question Q, deg(v) represents the degree of node v (i.e., the number of its adjacent nodes), and $c_{i-1}(v)$ represents the lexical centrality utility score for question v at the i−1th iteration. When the lexical centrality utility scores converge on a solution after a number of iterations, the scores may be considered to represent a stationary probability distribution.

In some embodiments, the question search system may combine the language modeling approach and the lexical centrality approach by using the language model utility score of a question as the initial value for the centrality of a question. The question search system may also represent the centrality of a question as follows:

$$c_i(Q) = d \cdot p_{norm}(Q) + (1-d) \sum_{v \in adj[Q]} \frac{c_{i-1}(v)}{deg(v)} \quad (4)$$

where $p_{norm}(Q)$ represents the likelihood of the question Q estimated by the language model.

In some embodiments, the question search system uses the utility of a question to rank search results of question searches. One skilled in the art, however, will appreciate that the utility of questions can be used in many other applications, such as analysis of questions posted to an automated help service, ranking answers to questions, and so on. In terms of question retrieval, the question search system may represent the relevance of a question to a queried question as the probabilistic function p(Q|Q') of generating the question Q from a language model of the queried question Q' as follows:

$$p(Q|Q') = \frac{p(Q'|Q)p(Q)}{p(Q')} \propto p(Q'|Q)p(Q) \quad (5)$$

Since the probability p(Q') of queried question Q' does not affect the relative probability of the question, it can be ignored and still preserve a ranking generated based on the probabilities.

The question search system may decompose the generated probability p(Q'|Q) into a unigram model by using a zero order Markov assumption as represented by the following:

$$p(Q|Q') \propto p(Q) \prod_{w \in Q'} p(w|Q) \quad (6)$$

where p(w|Q) represents the conditional probability of word w given question Q and p(Q) represents the prior probability of question Q reflecting a static rank of the question that is independent of the queried question Q'. Since the utility of a question is defined as the likelihood of a question regardless of a specific queried question, the question search system uses the language model utility score, the lexical centrality utility score, or a combination of the utility scores as a value of the probabilistic term p(Q) in this equation.

In some embodiments, the question search system may control the importance of each factor p(Q) in for retrieval using a log-linear form of Equation 6 as follows:

$$p(Q|Q') \propto \frac{1}{Z(\lambda_1, \lambda_2)}\left[\lambda_1 \log p(Q) + \lambda_2 \sum_{w \in Q'} \log p(w|Q)\right] \quad (7)$$

where $\lambda_1$ and $\lambda_2$ represent interpolation parameters and $Z(\lambda_1, \lambda_2)$ represents a normalization factor. Since the normalization factor $Z(\lambda_1, \lambda_2)$ also does not affect the relative probabilities, the question search system represents the probabilities as follows:

$$p(Q|Q') \propto \alpha \cdot \log p(Q) + \sum_{w \in Q'} \log p(w|Q) \quad (8)$$

where α is a constant represented as $\lambda_1/\lambda_2$. The question search system may estimate the unigram probability p(w|Q) using linear interpolated smoothing represented as follows:

$$p_{linear}(Q|Q') = \lambda_d \cdot p(w|Q) + (1-\lambda_d) \cdot p(w|C) \quad (9)$$

where C represents a question collection and $\lambda_d$ represents the smoothing parameter. In some embodiments, the optimal value for $\lambda_d$ can be empirically determined by exhaustive search of the parameter space. (See Zhai, C. and Lafferty, J., "A Study of Smoothing Methods for Language Models Applied to Ad Hoc Information Retrieval," *SIGIR* '01, 334-342, 2001, which is hereby incorporated by reference.)

FIG. 1 is a block diagram that illustrates components of a question search system in some embodiments. A question search system 110 may be connected to user computing devices 140, search engine services 150, and Q&A services 160 via communication link 130. The question search system includes a Q&A store 111 for storing at least questions of the collection and optionally answers associated with those questions and includes a question utility score store 112 that stores a utility score for each question in the collection. The question search system also includes a generate language model utility scores component 121, a generate counts component 122, a generate probabilities component 123, and a score language model utility component 124. The generate language model utility scores component invokes the generate counts component and the generate probabilities component to generate a language model based on unigrams, bigrams, and trigrams. A component also invokes the score language model utility component to calculate language model utility scores for the questions of the collection. The question search system also includes a generate lexical centrality utility scores component 125, a generate question graph component 126, and a score lexical centrality utility component 127. The generate lexical centrality utility scores component invokes the generate question graph component to generate a question graph with links between nodes representing similar questions and the score lexical centrality utility component to generate lexical centrality utility scores for questions of the collection. The question search system also includes a search for question component 113 and a question retrieval using utility component 114. The search for question component controls the input of questions and providing of search results. The question retrieval using utility component is invoked to rank questions based at least in part on utility scores.

The computing device on which the question search system may be implemented may include a central processing unit, memory, input devices (e.g., keyboard and pointing devices), output devices (e.g., display devices), and storage devices (e.g., disk drives). The memory and storage devices are computer-readable storage media that may contain instructions that implement the question search system. In addition, the data structures and message structures may be stored or transmitted via a computer-readable data transmission medium, such as a signal on a communications link. Various communications links may be used, such as the Internet, a local area network, a wide area network, or a point-to-point dial-up connection. The computer-readable media include computer-readable storage media and computer-readable data transmission media.

The question search system may be implemented in and/or used by various operating environments. The operating environment described herein is only one example of a suitable operating environment and is not intended to suggest any limitation as to the scope of use or functionality of the question search system. Other well-known computing systems, environments, and configurations that may be suitable for use include personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The question search system may be described in the general context of computer-executable instructions, such as program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

Figure 2:
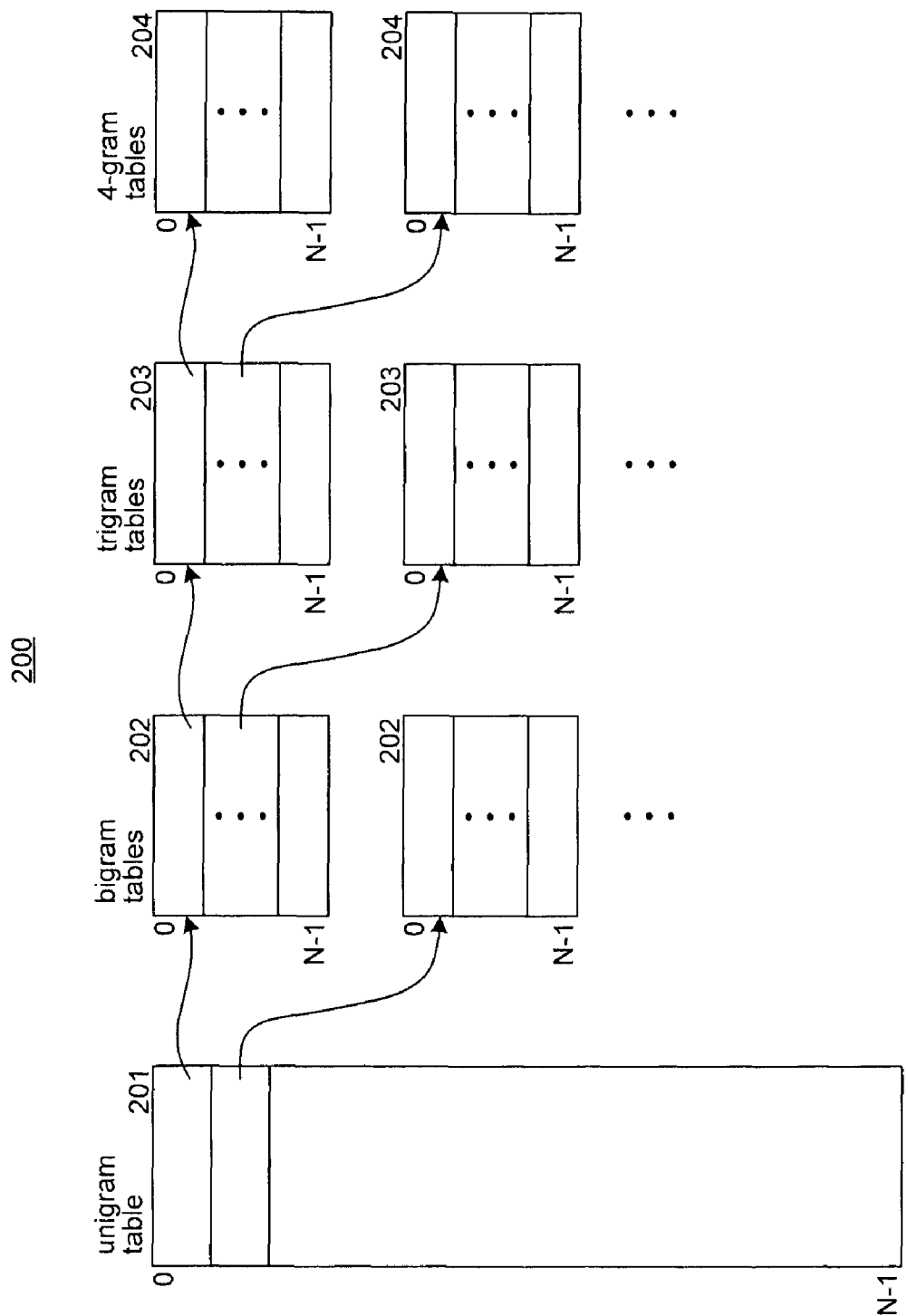
FIG. 2 is a block diagram that illustrates n-gram probability tables in some embodiments.

FIG. 2 is a block diagram that illustrates n-gram probability tables in some embodiments. A probability data structure 200 includes a unigram table 201, bigram tables 202, trigram tables 203, and 4-gram tables 204. The unigram table contains an entry for each word of the collection along with a count of the number of occurrences and a unigram probability of that word in the collection and a reference to a corresponding bigram table. Each bigram table contains an entry for each word in the collection along with a count of the occurrences in the collection of the bigram represented by the referencing entry in the unigram table and the entry in the bigram table. Each entry of the bigram also contains a bigram probability that the word of the entry will follow the unigram of the word of the referencing entry and contains a reference to a trigram table. Each trigram table contains an entry for each word in the collection along with the count of occurrences in the collection of the trigram represented by the words of the bigram of the referencing entry and word of the entry of the trigram table. Each entry of the trigram table also contains a trigram probability that the word of the entry will follow the bigram of the referencing entry and contains a reference to a 4-gram table. Each 4-gram table contains an entry for each word in the collection along with a count of the occurrences in the collection of the 4-gram represented by the trigram of the referencing entry of the trigram table and the word of the entry of the 4-gram table. Each entry also contains a probability that the word will follow the trigram.

Figure 3:
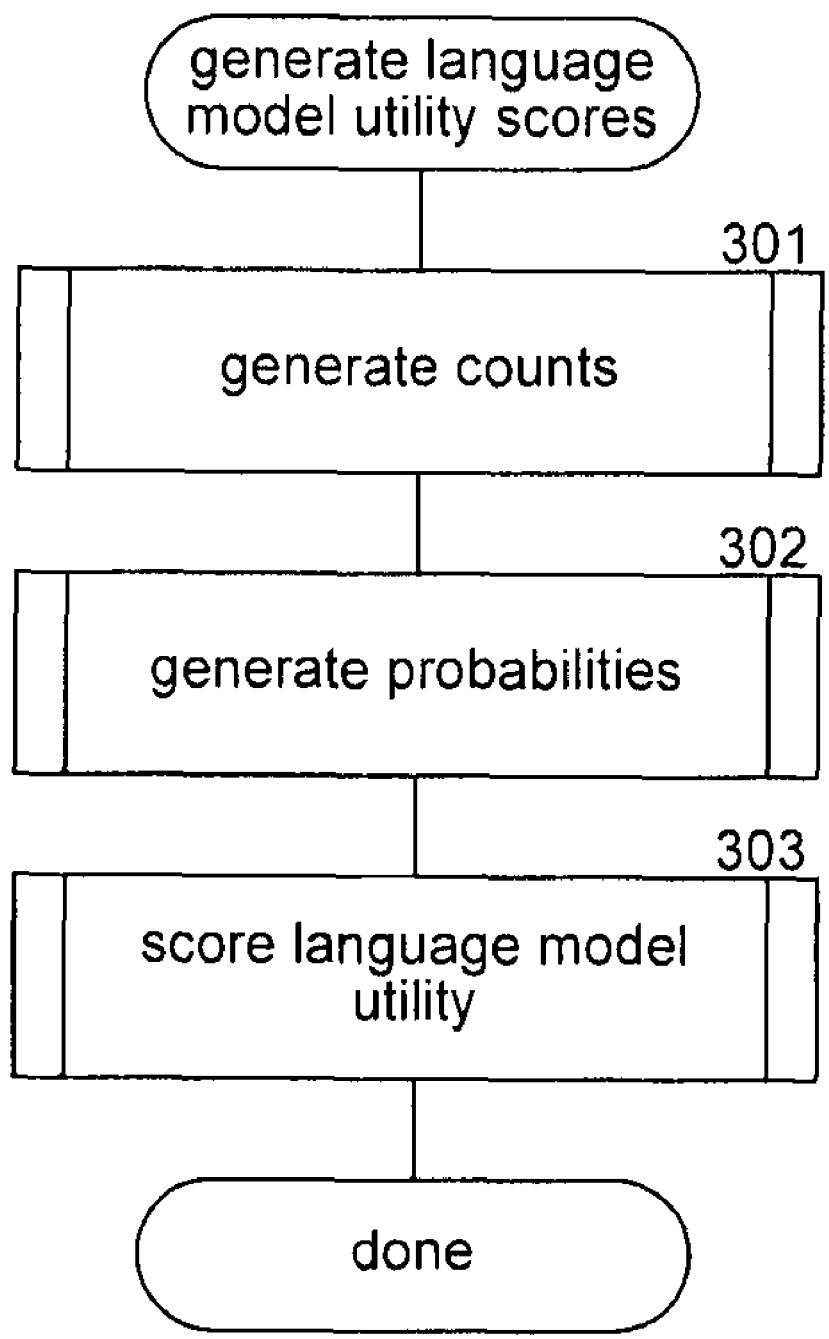
FIG. 3 is a flow diagram that illustrates the processing of the generate language model utility scores component in some embodiments of the question search system.

FIG. 3 is a flow diagram that illustrates the processing of the generate language model utility scores component in some embodiments of the question search system. The component generates trigram probabilities and then generates a language model utility score for each question in the collection. In block 301, the component invokes the generate counts component for unigrams, bigrams, and trigrams to generate the probability data structure 200 and initialize the counts. In block 302, the component invokes the generate probabilities component to calculate the probabilities of the probability data structure 200. In block 303, the component invokes the score language model utility component to generate language model utility scores and store the scores in the question utility score store. The component then completes.

Figure 4:
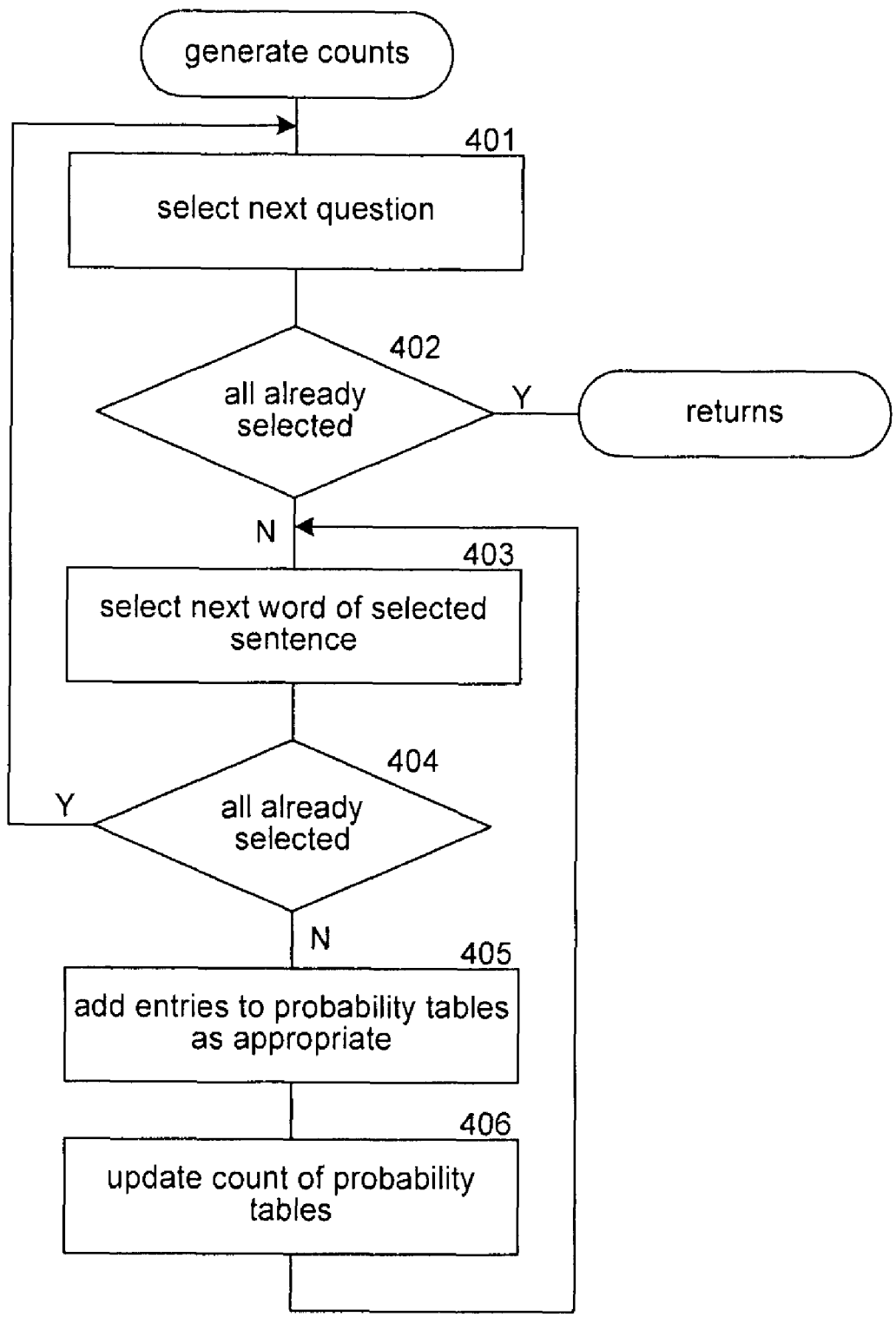
FIG. 4 is a flow diagram that illustrates the processing of the generate counts component of the question search system in some embodiments.

FIG. 4 is a flow diagram that illustrates the processing of the generate counts component of the question search system in some embodiments. The component generates the probability data structure 200. In blocks 401-406, the component loops selecting each question of the collection and generating counts for unigrams, bigrams, trigrams, and 4-grams of the sentences of the collection. In block 401, the component selects the next question of the collection. In decision block 402, if all the questions of the collection have already been selected, then the component returns, else the component continues at block 403. In block 403, the component selects the next word of the selected sentence. In decision block 404, if all the words of the selected sentence have already been selected, then the component loops to block 401 to select the next question, else the component continues at block 405. In block 405, the component adds entries into the probability tables as appropriate. If, for example, a selected word is the first word of the question, then the component may need to add/update an entry to the unigram table. If the selected word is the fourth word of the question, the component may need to add/update an entry to a 4-gram table for the 4-gram represented by the first four words of the question. One skilled in the art will appreciate that the question search system may ignore stop words (e.g., "of" and "the") of the questions. In block 406, the component increments the count of the unigram, bigram, trigram, and 4-gram represented by the selected word as appropriate. The component then loops to block 403 to select the next word in the sentence.

Figure 5:
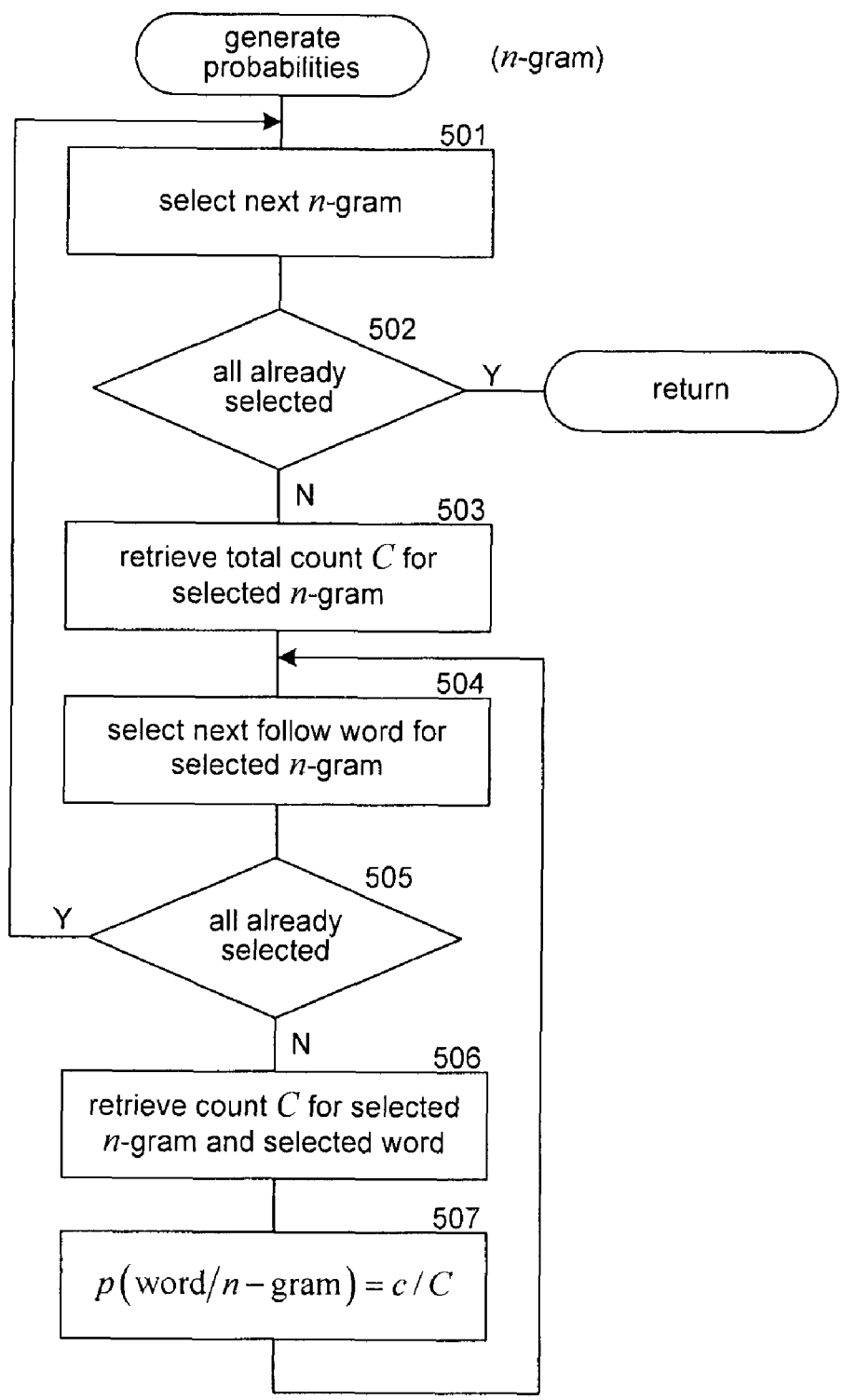
FIG. 5 is a flow diagram that illustrates the processing of the generate probabilities component of the question search system in some embodiments.

FIG. 5 is a flow diagram that illustrates the processing of the generate probabilities component of the question search system in some embodiments. The component is invoked to calculate the probabilities for words that follow unigrams, bigrams, and trigrams. It may be invoked repeatedly for unigrams, bigrams, and trigrams. In block 501, the component selects the next n-gram. In decision block 502, if all the n-grams have already been selected, then the component returns, else the component continues at block 503. In block 503, the component retrieves the total count C for the selected n-gram. In blocks 504-507, the component loops selecting each word as a following word to the selected n-gram and calculating its probability. In block 504, the component selects the next word as following the selected n-gram. In decision block 505, if all the words for the selected n-gram have already been selected, then the component loops to block 501, else the component continues at block 506. In block 506, the component retrieves the count C for the selected word following the selected n-gram. In block 507, the component calculates the probability for the selected word given the selected n-gram (e.g., c/C). The component then loops to block 504 to select the next following word. As described above, the component may also update the tables to account for sparseness of n-grams using a back-off method.

Figure 6:
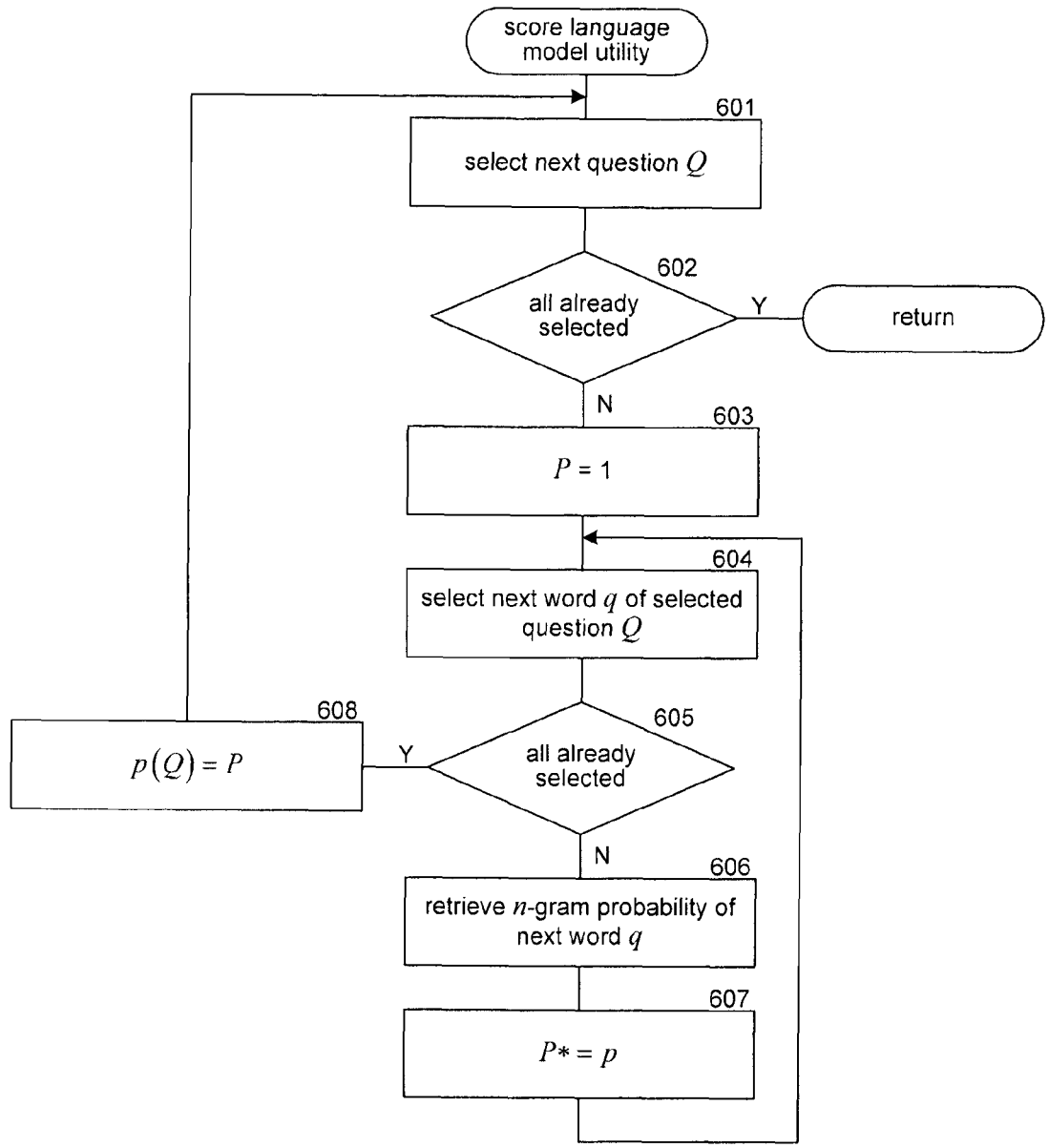
FIG. 6 is a flow diagram that illustrates the processing of a score language model utility component of the question search system in some embodiments.

FIG. 6 is a flow diagram that illustrates the processing of a score language model utility component of the question search system in some embodiments. The component generates a language model utility score for each question in the collection. In block 601, the component selects the next question. In decision block 602, if all the questions have already been selected, then the component returns, else the component continues at block 603. In block 603, the component initializes the utility score for the selected question. In blocks 604-607, the component loops combining the n-gram probabilities of the words in the question into the utility score. In block 604, the component selects the next word of the selected question. In decision block 605, if all the words of the selected question have already been selected, then the component continues at block 608, else the component continues at block 606. In block 606, the component retrieves the n-gram probability of the selected word. In block 607, the component accumulates the utility score and then loops to block 604 to select the next word of the selected question. Alternatively, the component may sum the logarithms of the probabilities, rather than multiplying the probabilities. In block 608, the component sets the utility score for the selected question and then loops to block 601 to select the next question.

Figure 7:
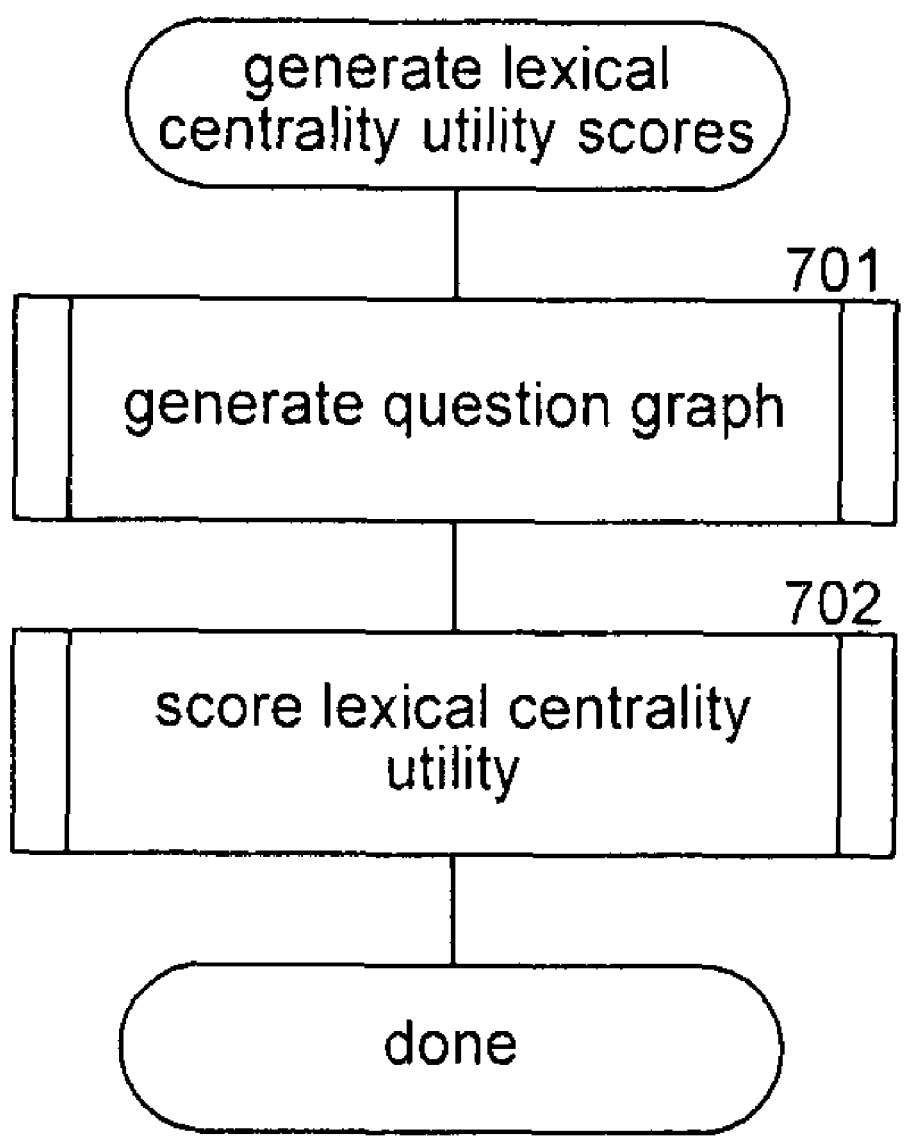
FIG. 7 is a flow diagram that illustrates the processing of a generate lexical centrality utility scores component in some embodiments.

FIG. 7 is a flow diagram that illustrates the processing of a generate lexical centrality utility scores component in some embodiments. In block 701, the component invokes the generate question graph component. In block 702, the component invokes the score lexical centrality utility component and then completes.

Figure 8:
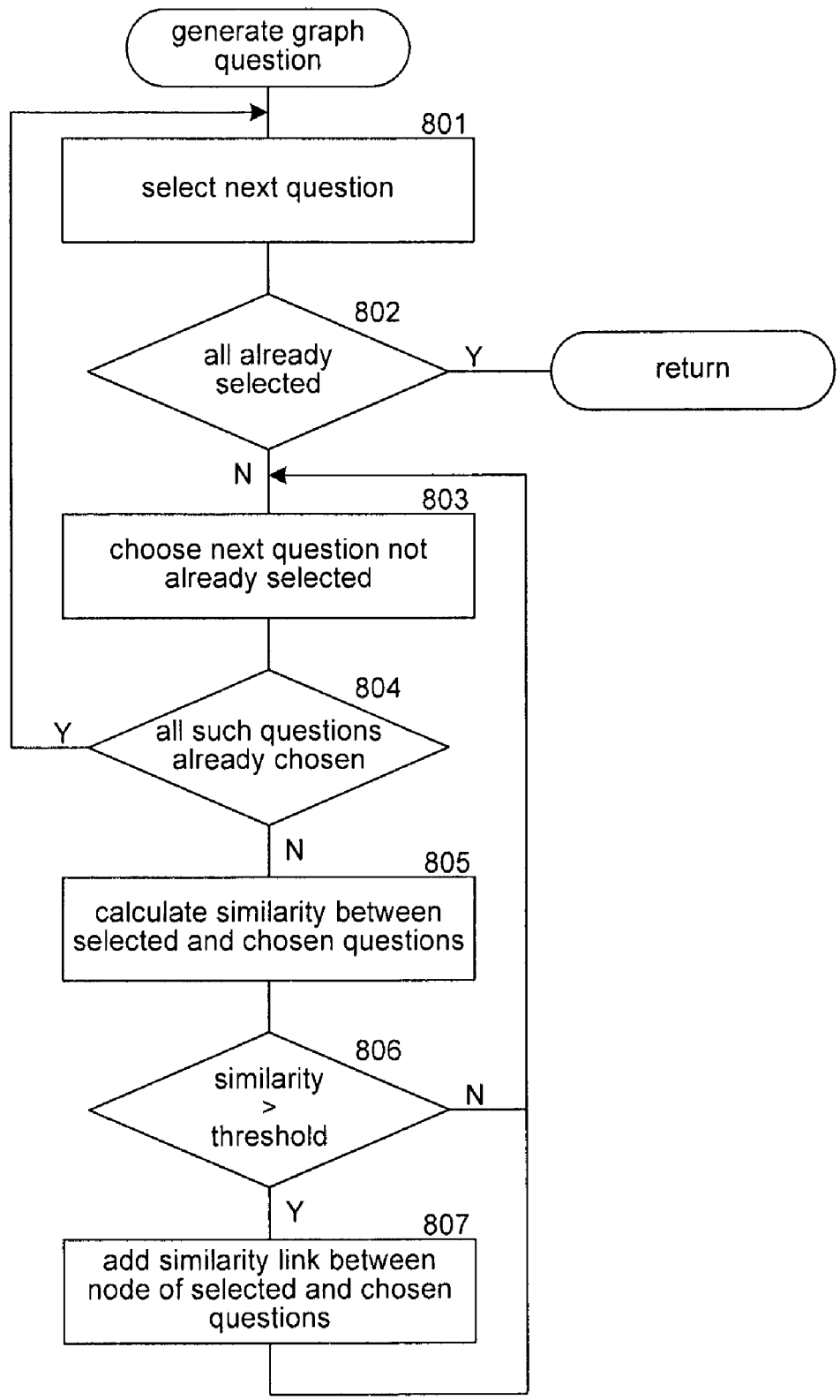
FIG. 8 is a flow diagram that illustrates the processing of a generate question graph component of the question search system in some embodiments.

FIG. 8 is a flow diagram that illustrates the processing of a generate question graph component of the question search system in some embodiments. The component generates a question graph for the questions of the collection. In block 801, the component selects the next question. In block 802, if all the questions have already been selected, then the component returns, else the component continues at block 803. In blocks 803-807, the component loops adding links between the selected node and each other node of the graph when the similarity between the nodes is above a similarity threshold. In block 803, the component chooses the next question that has not already been selected. In decision block 804, if all such questions have already been chosen for the selected question, then the component loops to block 801 to select the next question, else the component continues at block 805. In block 805, the component calculates the similarity between the selected and chosen questions. In decision block 806, if the similarity is greater than a threshold similarity, then the component continues at block 807, else the component loops to block 803 to choose the next question. In block 807, the component adds a similarity link between the nodes of the selected and chosen questions and then loops to block 803 to select the next question.

Figure 9:
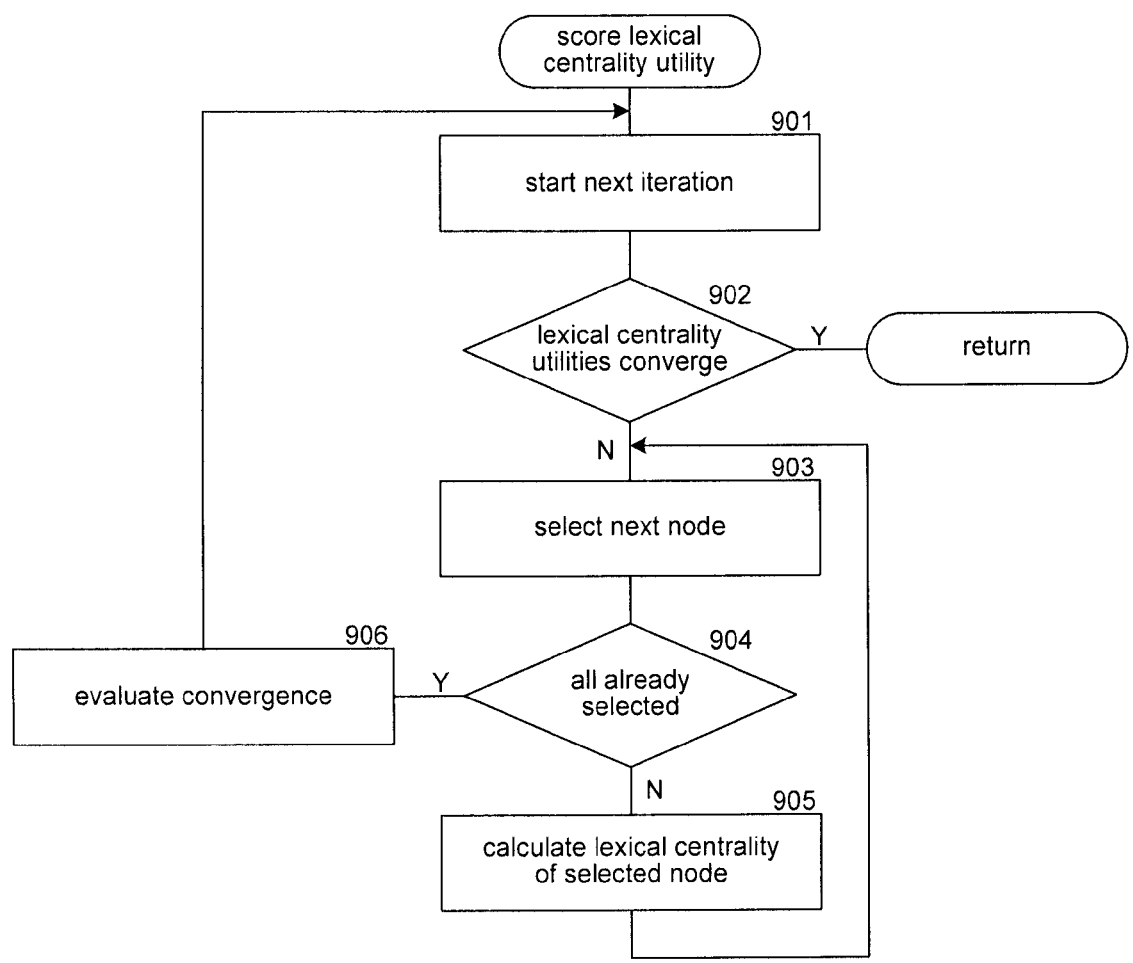
FIG. 9 is a flow diagram that illustrates the processing of a score lexical centrality utility component of the question search system in some embodiments.

FIG. 9 is a flow diagram that illustrates the processing of a score lexical centrality utility component of the question search system in some embodiments. The component generates a lexical centrality utility score for each question of the collection using a PageRank-type algorithm. In block 901, the component starts the next iteration. In decision block 902, if the lexical centrality utility scores have converged on a solution, then the component returns, else the component continues at block 903. In blocks 903-905, the component loops calculating a lexical centrality utility score for each node of the question graph for the current iteration using Equation 3 or 4. In block 903, the component selects the next node of the question graph. In decision block 904, if all the nodes have already been selected, then the component continues at block 906, else the component continues at block 905. In block 905, the component calculates a lexical centrality utility score for the selected node and then loops to block 903 to select the next node. In block 906, the component evaluates whether the lexical centrality utility scores for the iterations have converged on a solution and then loops to block 901 to start the next iteration. The scores may converge when the difference between the scores for one iteration and the next iteration are within a threshold difference.

Figure 10:
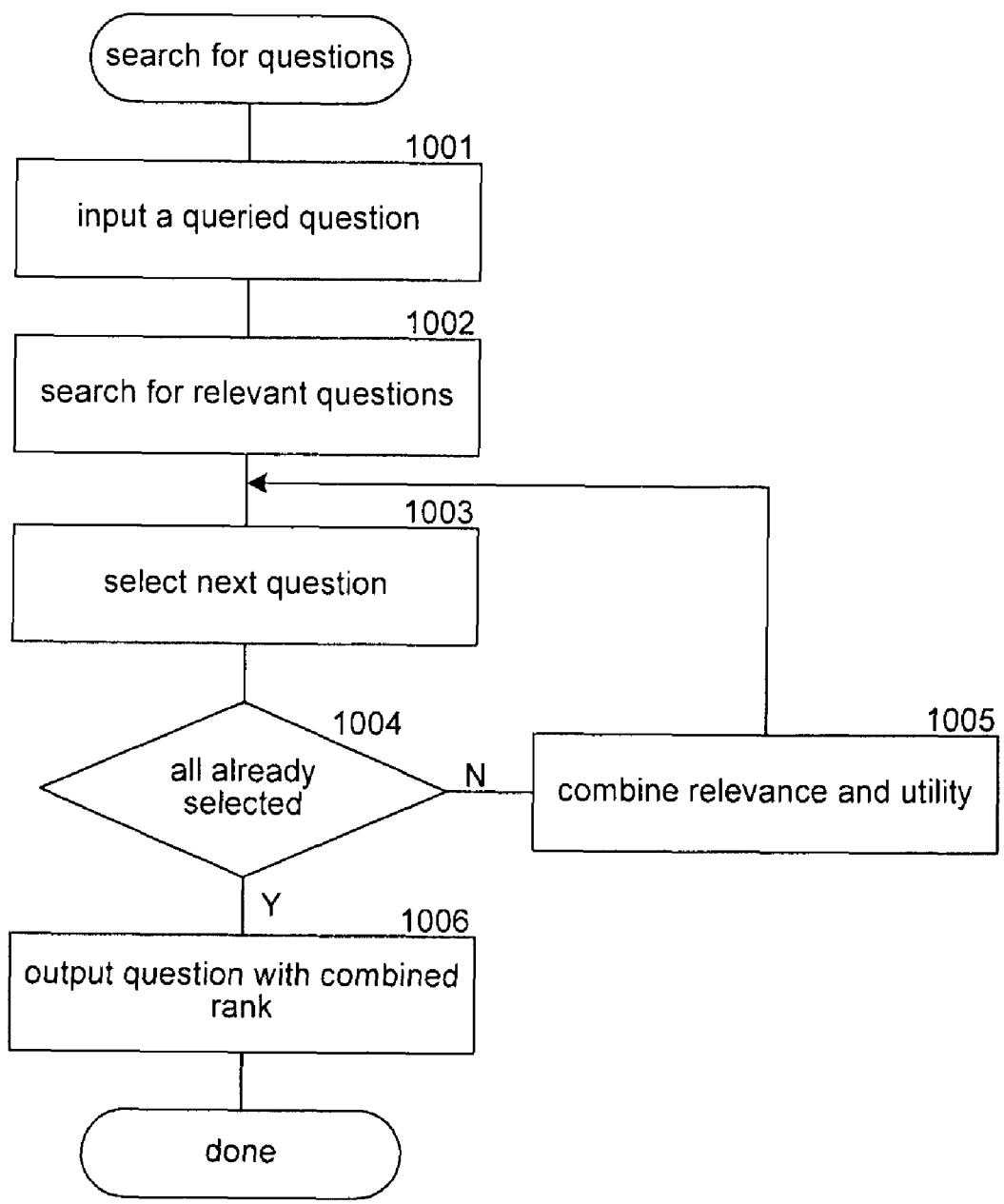
FIG. 10 is a flow diagram that illustrates the overall processing of a search for question component of the question search system in some embodiments.

FIG. 10 is a flow diagram that illustrates the overall processing of a search for question component of the question search system in some embodiments. In block 1001, the component inputs a queried question. In block 1002, the component searches for questions within the collection that are relevant to the queried question. In blocks 1003-1005, the component loops combining the relevance scores and utility scores for the relevant questions. In block 1003, the component selects the next relevant question. In decision block 1004, if all the relevant questions have already been selected, then the component continues at block 1006, else the component continues at block 1005. In block 1005, the component combines the relevance score and utility score for the selected question and then loops to block 1003 to select the next question. In block 1006, the component outputs the relevant questions ranked based on the combined scores and then completes.

Figure 11:
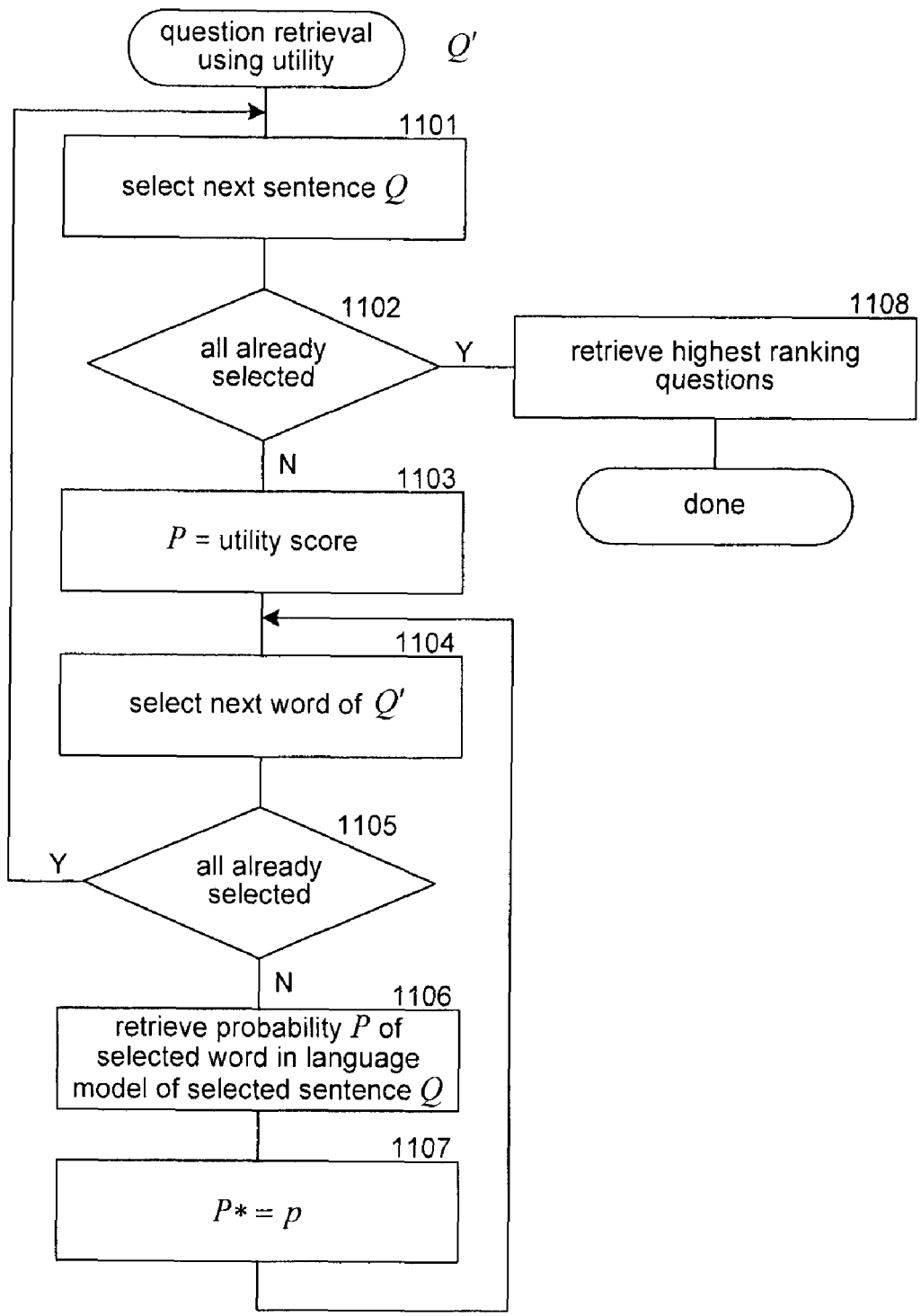
FIG. 11 is a flow diagram that illustrates the processing of a question retrieval using utility component of the question search system in some embodiments.

FIG. 11 is a flow diagram that illustrates the processing of a question retrieval using utility component of the question search system in some embodiments. The component is passed a queried question and returns an indication of relevant questions ranked based, at least in part, on utility. In block 1101, the component selects the next sentence of the collection. In decision block 1102, if all the sentences have already been selected, then the component continues at block 1108, else the component continues at block 1103. In block 1103, the component initializes the combined score to the utility score of the selected sentence. In decision blocks 1104-1107, the component loops factoring in the probability that the selected sentence will be generated from the language model of the queried question. In block 1104, the component selects the next word of the queried question. In decision block 1105, if all the words of the queried question have already been selected, then the component loops to block 1101 to select the next question of the collection, else the component continues at block 1106. In block 1106, the component retrieves the probability of the selected word in the language model of the selected sentence. In block 1107, the component aggregates the probability into the combined score by multiplying the probabilities or adding the logarithm of the probabilities and then loops to block 1104 to select the next word of the queried question. In block 1108, the component retrieves the highest-ranking questions and completes.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims. Accordingly, the invention is not limited except as by the appended claims.

We claim:

1. A method in a computing device for evaluating utility of a question, the method comprising:
   providing a collection of questions, each question having one or more words;
   calculating by the computing device n-gram probabilities for the words within the questions of the collection; and
   for each question in the collection, calculating by the computing device a language model utility score of that question occurring in the collection based on the n-gram probabilities of words of that question following preceding n−1 words, wherein the language model utility score is a measure of the utility of the question.

2. The method of claim 1 wherein the calculating of the n-gram probabilities includes counting the number of each sequence of n−1 words in the questions of the collection and setting the n-gram probabilities of each word being preceded by each sequence.

3. The method of claim 1 including:
   identifying questions of the collection that match a queried question; and
   ranking the identified questions based on the utility of the questions.

4. The method of claim 3 including calculating the relevance of each identified question to the queried question and wherein the ranking of the identified question is based on both relevance and utility of the identified questions.

5. The method of claim 1 including, for each question in the collection, calculating a lexical centrality utility score of that question, wherein the lexical centrality utility score represents another measure of the utility of the question.

6. The method of claim 5 wherein the lexical centrality utility scores are probabilities and are calculated by:
   generating a question graph with nodes representing questions and links between adjacent nodes representing questions whose similarity satisfies a similarity threshold;
   establishing an initial lexical centrality utility score for the question of each node; and
   determining a stationary probability distribution for the lexical centrality utility scores for the nodes, wherein the lexical centrality utility score for a node is based on the lexical centrality utility score of that node and the lexical centrality utility scores of adjacent nodes.

7. The method of claim 6 wherein the determining of a stationary probability distribution includes iteratively calculating the lexical centrality utility score for each node based on the lexical centrality utility scores of a previous iteration.

8. The method of claim 6 wherein the initial lexical centrality utility scores are derived from initial language model utility scores.

9. The method of claim 5 wherein the lexical centrality utility scores and the language model utility scores of the questions are combined to provide overall utility scores of the questions.

10. The method of claim 1 wherein the language model utility score is used to calculate relevance of a question to a queried question during question retrieval.

11. A computing device for ranking questions that are relevant to queried questions, comprising:
   a collection store providing a collection of questions, each question having one or more words;
   a component that calculates n-gram probabilities for words following sequences of n−1 words within the questions of the collection;
   a component that calculates, for each question in the collection, a language model utility score of that question occurring in the collection based on the probabilities of the n-grams of that question, the language model utility score being calculated using a smoothing technique to account for data sparseness and a length normalization technique to account for differences in lengths of the question;
   a component that receives from a user a queried question;
   a component that identifies questions of the collection that are relevant to the queried question, each identified question having a relevance score;
   a component that, for each identified question, generates a combined score for the identified question based on the relevance score for that identified question and the language model utility score for that identified question; and
   a component that displays to the user an indication of identified questions with a ranking based on the combined scores of the identified questions.

12. The computing device of claim 11 including a component that calculates, for each question in the collection, a lexical centrality utility score of that question, wherein the component that generates a combined score factors in the lexical centrality utility scores of the identified questions.

13. The computing device of claim 12 wherein the lexical centrality utility scores are probabilities and the component that calculates the lexical centrality utility score:
   generates a question graph with nodes representing questions and links between adjacent nodes representing questions whose similarity satisfies a similarity threshold;

establishes an initial lexical centrality utility score for the question of each node; and determines a stationary probability distribution for the lexical centrality utility scores for the nodes, wherein the lexical centrality utility score for a node is based on the lexical centrality utility score of that node and the lexical centrality utility scores of adjacent nodes.

14. The computing device of claim 13 wherein the initial lexical centrality utility score of a question is derived from the language model utility score for that question.

15. The computing device of claim 11 wherein the language model utility score is derived from the following:

$$p(Q) = p(q_1, q_2, \ldots q_m) \approx \sum_{i=1}^{m} p(q_i \mid q_{i-n+1}^{i-1})$$

where p(Q) represents the probability of question Q, $q_i$ represents the ith word in question Q, $q_{i-n+1}^{i-1}$ represents a sequence of n−1 words from word $q_{i-n+1}$ to word $q_{i-1}$, and $p(q_i \mid q_{i-n+1}^{i-1})$ represents the conditional probability of word $q_i$ given the sequence of n−1 words $q_{i-n+1}^{i-1}$.

16. The computing device of claim 11 wherein the combined score is derived from the following:

$$p(Q \mid Q') \propto p(Q) = \prod_{w \in Q'} p(w \mid Q)$$

where p(Q|Q') represents the combined score for question Q and queried question Q', p(Q) represents the language model utility score for question Q, and p(w|Q) represents the probability of word w of queried question Q' given question Q.

17. The computing device of claim 11 wherein the component that generates a combined score uses a log-linear model to combine the language model utility score and the relevance score.

18. A storage device containing instructions for controlling a computing device to rank questions that are relevant to queried questions, by a method comprising:

providing a collection of questions, each question having one or more words;

for each question of the collection, calculating a utility score for the question, the utility score indicating a likelihood that the question is submitted;

receiving a queried question;

identifying questions of the collection that are relevant to the queried question;

for each identified question, generating a ranking for the identified question based on the utility scores of the identified questions; and providing the identified questions with their ranking as a search result for the queried question.

19. The storage device of claim 18 wherein the calculating of a utility score includes calculating n-gram probabilities for words within the questions of the collection and calculating, for each question in the collection, a language model utility score of that question occurring in the collection based on the n-gram probabilities of words of that question.

20. The storage device of claim 18 wherein the calculating of a utility score includes calculating, for each question in the collection, a lexical centrality utility score of that question.

21. The storage device of claim 20 wherein the calculating of the lexical centrality utility scores of questions includes:

generating a question graph with nodes representing questions and links between adjacent nodes representing questions whose similarity satisfies a similarity threshold;

establishing an initial lexical centrality utility score for the question of each node; and determining a stationary probability distribution for the lexical centrality utility scores for the nodes, wherein the lexical centrality utility score for a node is based on the lexical centrality utility score of that node and the lexical centrality utility scores of adjacent nodes.

\* \* \* \* \*

UNITED STATES PATENT AND TRADEMARK OFFICE
CERTIFICATE OF CORRECTION

| | | |
|---|---|---|
| PATENT NO. | : 8,112,269 B2 | Page 1 of 1 |
| APPLICATION NO. | : 12/197991 | |
| DATED | : February 7, 2012 | |
| INVENTOR(S) | : Yunbo Cao et al. | |

It is certified that error appears in the above-identified patent and that said Letters Patent is hereby corrected as shown below:

IN THE CLAIMS:

In column 13, line 30, in Claim 16, delete " $p(Q|Q') \propto p(Q) = \prod_{w \in Q'} p(w|Q)$ " and insert -- $p(Q|Q') \propto p(Q) \prod_{w \in Q'} p(w|Q)$ --, therefor.

Signed and Sealed this
Twenty-seventh Day of March, 2012

David J. Kappos
*Director of the United States Patent and Trademark Office*